(12) United States Patent
Chen et al.

(10) Patent No.: US 12,436,996 B2
(45) Date of Patent: Oct. 7, 2025

(54) SYSTEMS AND METHODS FOR RETRIEVING PERSONALIZED RATINGS OF CONTENT ITEMS FROM A PREFERRED SERVICE

(71) Applicant: Adeia Guides Inc., San Jose, CA (US)

(72) Inventors: Tao Chen, Palo Alto, CA (US); Serhad Doken, Bryn Mawr, PA (US); Reda Harb, Issaquah, WA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/207,910

(22) Filed: Jun. 9, 2023

(65) Prior Publication Data

US 2024/0411810 A1    Dec. 12, 2024

(51) Int. Cl.
   *G06F 16/78* (2019.01)
   *G06F 16/74* (2019.01)

(52) U.S. Cl.
   CPC ........ *G06F 16/7867* (2019.01); *G06F 16/743* (2019.01)

(58) Field of Classification Search
   CPC .......................... G06F 16/7867; G06F 16/743
   See application file for complete search history.

(56) References Cited

U.S. PATENT DOCUMENTS

| | | | |
|---|---|---|---|
| 6,871,197 B1 * | 3/2005 | Johnson ................. | G06F 16/958 706/14 |
| 6,978,310 B1 * | 12/2005 | Rodriguez ......... | H04N 21/4314 348/E5.002 |
| 7,552,220 B2 * | 6/2009 | Marmigere ............... | H04L 9/40 709/227 |
| 7,895,177 B2 * | 2/2011 | Wu .......................... | H04W 4/02 707/706 |
| 8,078,615 B2 * | 12/2011 | Smith .................. | G06F 16/9535 715/810 |
| 8,307,110 B1 * | 11/2012 | Katzer ................ | H04L 12/1859 709/219 |
| 8,468,083 B1 * | 6/2013 | Szulczewski .......... | G06Q 30/02 705/37 |
| 8,850,481 B2 * | 9/2014 | Shannon ................ | H04N 21/47 725/47 |
| 9,232,251 B2 * | 1/2016 | Dasgupta ............. | H04N 21/251 |
| 9,519,710 B1 * | 12/2016 | Chapman ............ | G06F 16/7867 |

(Continued)

OTHER PUBLICATIONS

"How Netflix's Recommendations System Works," [retrieved from URL: https://help.netflix.com/en/node/100639] (3 pages).

(Continued)

*Primary Examiner* — Debbie M Le
*Assistant Examiner* — Huen Wong
(74) *Attorney, Agent, or Firm* — Haley Guiliano LLP

(57) ABSTRACT

Systems and methods are provided that allow a server of a first content service provider, to send a query to a server of another service provider. The query includes a user ID and list of content IDs related to media content available on the first service. In response to the query, the server of the second service retrieves personalized content ratings for each content item associated with the list of content IDs, where the personalized content ratings are generated by a recommendation model of the second service. The personalized content ratings are transmitted back to the first service and displayed on a first service user interface.

20 Claims, 12 Drawing Sheets

(56) References Cited

U.S. PATENT DOCUMENTS

| | | | | |
|---|---|---|---|---|
| 9,854,314 | B1* | 12/2017 | Wittke | H04N 21/482 |
| 9,900,659 | B1* | 2/2018 | Norum | H04N 21/442 |
| 10,346,550 | B1* | 7/2019 | Botta | G06F 16/2228 |
| 10,448,115 | B1* | 10/2019 | Jamal | G10L 15/1815 |
| 10,521,693 | B1* | 12/2019 | Knas | G06V 20/30 |
| 2003/0036848 | A1* | 2/2003 | Sheha | H04W 4/02 |
| | | | | 340/990 |
| 2004/0068579 | A1* | 4/2004 | Marmigere | H04L 9/40 |
| | | | | 719/315 |
| 2004/0078224 | A1* | 4/2004 | Schramm-Apple | G09B 5/00 |
| | | | | 705/2 |
| 2005/0131918 | A1* | 6/2005 | Hillis | G06Q 30/02 |
| 2005/0149395 | A1* | 7/2005 | Henkin | G06Q 30/0273 |
| | | | | 707/E17.116 |
| 2005/0270311 | A1* | 12/2005 | Rasmussen | G09B 29/10 |
| | | | | 345/677 |
| 2005/0278739 | A1* | 12/2005 | Yaksick | H04N 21/4821 |
| | | | | 725/39 |
| 2005/0283734 | A1* | 12/2005 | Santoro | G06F 3/0481 |
| | | | | 715/765 |
| 2006/0047649 | A1* | 3/2006 | Liang | G06F 16/338 |
| 2007/0060099 | A1* | 3/2007 | Ramer | G06Q 30/0255 |
| | | | | 707/E17.109 |
| 2007/0136753 | A1* | 6/2007 | Bovenschulte | H04N 7/17318 |
| | | | | 348/E7.071 |
| 2007/0162424 | A1* | 7/2007 | Jeh | G06F 16/9538 |
| 2008/0126303 | A1* | 5/2008 | Park | G06F 16/78 |
| 2008/0168066 | A1* | 7/2008 | Ruiz-Velasco | H04N 21/84 |
| 2008/0243733 | A1* | 10/2008 | Black | G06F 16/686 |
| | | | | 706/16 |
| 2009/0133048 | A1* | 5/2009 | Gibbs | G06F 16/48 |
| | | | | 725/14 |
| 2009/0144237 | A1* | 6/2009 | Branam | G06Q 20/4014 |
| 2009/0164421 | A1* | 6/2009 | Pacella | G06F 16/2453 |
| 2009/0282013 | A1* | 11/2009 | Joshi | G06F 16/951 |
| | | | | 707/999.005 |
| 2010/0100950 | A1* | 4/2010 | Roberts | H04L 63/08 |
| | | | | 709/229 |
| 2011/0296463 | A1* | 12/2011 | Suslov | G06F 16/25 |
| | | | | 707/E17.014 |
| 2012/0295640 | A1* | 11/2012 | Mei | G06Q 30/02 |
| | | | | 455/456.3 |
| 2013/0167168 | A1* | 6/2013 | Ellis | H04N 21/458 |
| | | | | 725/12 |
| 2014/0157295 | A1* | 6/2014 | Jagtiani | H04N 21/44222 |
| | | | | 725/13 |
| 2014/0201457 | A1* | 7/2014 | Sinai | G06F 16/9574 |
| | | | | 711/135 |
| 2015/0113570 | A1* | 4/2015 | Klarfeld | H04N 5/76 |
| | | | | 725/58 |
| 2015/0149544 | A1* | 5/2015 | Zhang | G06Q 10/109 |
| | | | | 709/204 |
| 2016/0127683 | A1* | 5/2016 | Hanson | H04N 7/15 |
| | | | | 348/14.08 |
| 2016/0255089 | A1* | 9/2016 | Diestler | G06F 21/6236 |
| | | | | 726/4 |
| 2017/0061025 | A1* | 3/2017 | Arora | G06F 16/29 |
| 2017/0118526 | A1* | 4/2017 | Tanji | H04N 21/812 |
| 2017/0134793 | A1* | 5/2017 | Harb | H04N 21/4122 |
| 2017/0228550 | A1* | 8/2017 | Harb | G06F 21/6218 |
| 2017/0235436 | A1* | 8/2017 | Hooton | G06F 3/04817 |
| | | | | 705/7.11 |
| 2017/0244719 | A1* | 8/2017 | Damick | G06Q 30/02 |
| 2017/0251259 | A1 | 8/2017 | Klappert et al. | |
| 2018/0192144 | A1* | 7/2018 | McElroy | H04N 21/8456 |
| 2018/0324272 | A1* | 11/2018 | Toal | H04L 67/02 |
| 2019/0171753 | A1* | 6/2019 | Teng | G06F 16/285 |
| 2020/0026772 | A1* | 1/2020 | Wheeler | G06F 16/248 |
| 2020/0304855 | A1 | 9/2020 | Gupta et al. | |
| 2021/0329331 | A1* | 10/2021 | Felman | H04N 21/435 |
| 2023/0360079 | A1* | 11/2023 | Rajendran | G06F 3/0304 |

OTHER PUBLICATIONS

"Prime Ratings: MDb Ratings on Prime Video," [retrieved from URL: https://chrome.google.com/webstore/detail/prime-ratings-imdb-rating/nfhhcokdlgiihdofklhifafmmhnljbdf?hl=en-US] (1 page).

"Review—Rotten Tomatoes," [retrieved from https://www.rottentomatoes.com/] (6 pages).

"Trim: IMDB Ratings on Netflix and Prime Video—Chrome Web Store," [retrieved from URL: https://chrome.google.com/webstore/detail/trim-imdb-ratings-on-netf/lpgajkhkagnpdjklmpgjeplmgffnhhjj] (6 pages).

Anonymous: "Documentation: Asynchronous Initiation Function of the Rating-Widget Library", XP093193453, [retrieved from URL: https://web.archive.org/web/20230529025521/https://rating-widget.com/documentation/], 1-12 (May 29, 2023).

Anonymous: "rating widget—Only 2 minutes to setup 1 Swift Implementation",XP093193451, Retrieved from URL: https://web.archive.org/web/20230530221916/http://rating-widget.com/], 1 page, May 30, 2023.

* cited by examiner

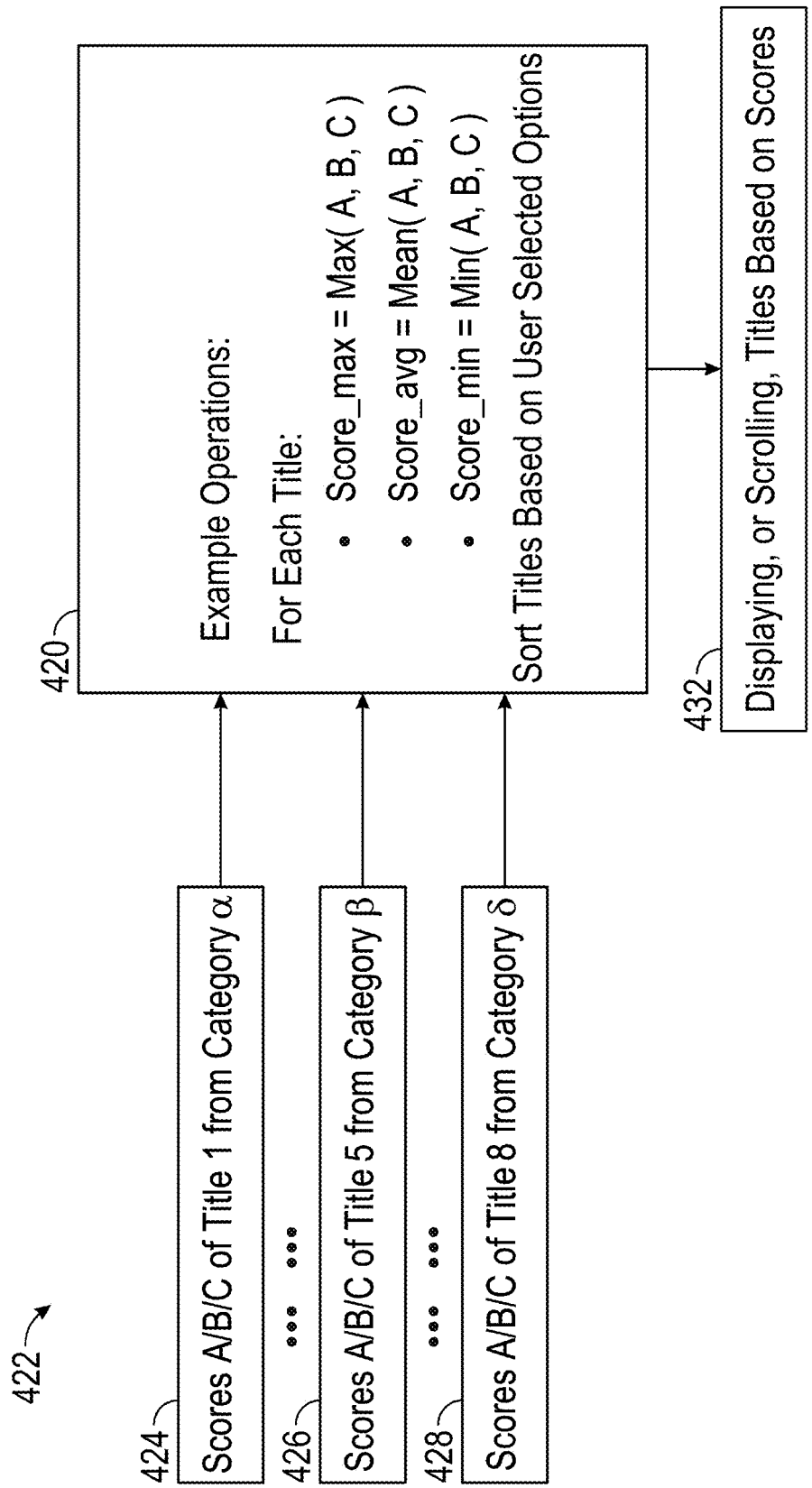

SYSTEMS AND METHODS FOR RETRIEVING PERSONALIZED RATINGS OF CONTENT ITEMS FROM A PREFERRED SERVICE

BACKGROUND

This disclosure is directed to systems and methods for providing personalized content ratings for media content from a preferred service for a user profile.

SUMMARY

Media content providers enable user devices to access more media content than ever before. With such a large amount of content available to display on user interfaces of various user devices, it can prove challenging for delivery systems to provide accurate recommendations of content for consumption.

In one approach, media providers use an internal model that analyzes user profile data, such as viewing history or location, to generate content recommendations tailored to the user profile. The content recommendations can be displayed along with the content in a UI to efficiently display ratings related to content items. However, in some embodiments, the content recommendations are limited to a recommendation model or algorithm provided by a single service, often the content service being used to search for new media to consume. Even if a user has a separate account with a second content service, the content ratings provided by the second content service are not accessible within the first service. Additionally, the user data that recommendations are based on are limited to data collected from a single content service and the recommendation model of the content service. Personalized content ratings rely on user data available to that service, and the recommendation model may lack access to the most recent viewing habits of a user, for example if a user accesses alternate services to watch content as well, and therefore the recommendation model will generate inaccurate and less relevant recommendations to the user.

The recommendation model of a single content service will often only have access to user data related to a first circumstance (e.g., user data related to accessing content from a particular content provider and/or at a particular time of day and/or on a particular device), and may allow metadata from the first circumstance to contaminate and/or decorrelate recommendations generated in a second circumstance that has no overlap the with the first circumstance (e.g., based on user data relating to accessing content from a different content provider and/or at a different time of day and/or at a different device than in the first circumstance).

In other embodiments, content ratings from external sources are displayed alongside content, such as aggregated review ratings from content reviewers. These ratings, however, are not personalized or adjusted for each individual user profile, and therefore may only be relevant or helpful to a small portion of users profiles.

To overcome these problems, systems and methods are provided herein that allow a server of a first content service provider, or a first service, to send a query (e.g., via an API) to a server of another service provider, or a second service. In some approaches, the query includes a user ID and list of content IDs related to media content available on the first service. In response to the query, the server of the second service retrieves personalized content ratings for each content item associated with the list of content IDs, where the personalized content ratings are generated by a recommendation model of the second service. The personalized content ratings are transmitted back to the first service and displayed on the first service UI. In some embodiments, the requested content ratings may include multiple levels of granularity, e.g., personalized ratings for a single content item, for a category of content items, or for multiple categories of content items to be displayed on a landing page of the first service UI. Thus, personalized content ratings generated by a recommendation model of the second service are displayed for content media available on the first service.

In further embodiments, a first service provides the capability of selectively specifying which content services should be used to generate the personalized content ratings. In a further embodiment, personalized recommendations are requested from multiple content services, and either individual or aggregated content ratings are generated based on recommendation models of the multiple content services, and displayed on the first service UI. In a further embodiment, weight values may be assigned, automatically or manually, to specific content services, e.g., if a particular content service provides ratings that are determined to more often align with successful recommendation for a user profile, compared to other content services, more weight is assigned to the recommendations of that service, and the aggregated personalized ratings of content that are generated from the multiple content services will assign more weight to the recommendation model of the preferred service.

Systems and methods are provided herein for modifying a UI according to generated personalized content ratings. In some embodiments, the order of content displayed on the UI of a first service is modified to display content in an order that is based on updated content ratings, genres of the content items, a microgenre of the content items, time of day that the first service is accessed, and the like. In some embodiments, an option to adjust how the personalized content recommendations are generated and how the generated personalized content recommendations are displayed is provided.

In one embodiment, content that is already known to be a high match for a user profile from the second service, but unavailable on that service, is retrieved and displayed on the first service. As an example, a content item may have been previously available and highly rated on the second service. If the content item is currently no longer available on the second service, but is available on the first service, the content item rating from the second service is displayed on the UI of the first service. Similarly, if a first season of a television show is available and highly rated on the second service, but the second season is only available on the first service, the first service can display the second season of the show and indicate that it is highly rated based on the rating from the second service.

In one embodiment, if the content is available on both the first and the second services, but personalized content ratings related to the user profile are only available from the second service, the personalized ratings are displayed on the UI of the first service.

In one embodiment, personalized content ratings that are not available on the second service, but are able to be determined based on user preferences from the second service, using either a recommendation model of the first service or of the second service, are displayed on the UI of the first service.

In one embodiment, the UI landing page, or home screen, of the first service, e.g., a first screen showing content available to watch, is arranged based on the personalized content ratings imported from the second service. Further, when entering a category, e.g., comedy television shows, the order of content is arranged based on the imported ratings from the second service. Additionally, the imported ratings can be displayed with or overlayed on the content within the category screen.

In one embodiment, multiple user preferences from more than one content service are imported into the first service, and the UI landing page of the first service provides options to display content ratings based on some or all of the imported user preferences. In a further embodiment, an aggregated ratings score is determined based on multiple user preference-based scores from multiple services.

In one embodiment, non-personalized ratings of content are accessed and used in conjunction with personalized ratings based on user preferences. For example, a UI of a first service can display two ratings relating to a piece of content, e.g., non-personalized ratings from an aggregating reviewer website and personalized ratings based on a recommendation model of a second service, overlayed on a content item.

In one embodiment, multiple user preferences from multiple content services and/or from non-personalized rating sources are imported, where weights associated with each service are adjustable in determining a new "total" score for display within the UI of a first service, e.g., more weight is assigned to personalized ratings and less weight to ratings retrieved from aggregating reviewer websites. Such an adjustment can be controlled within a first service UI, e.g., via a graphical slider.

In one embodiment, when the first service requests the personalized ratings from the second service, the second service generates an updated version of the personalized ratings. As an example, a content item was rated as a 60% match for a user in January on the second service, and was subsequently dropped and is no longer accessible on the second service. The content item becomes available on the first service in July, but based on a user profile and data of the user collected between January and July, the rating according to the recommendation model of the second service is now determined to be an 85% match. When the first service requests the personalized ratings from the second service, the second service will recalculate the personalized rating and provide the updated 85% match rating to the first service.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIGS. 4A and 4B are flowcharts of a method for generating an aggregated personalized content rating, in accordance with some embodiments of this disclosure.

DETAILED DESCRIPTION

FIGS. 1A-1D show an illustrative diagrams of displaying personalized content ratings on a user interface (UI) of a content service, in accordance with some embodiments of this disclosure. It should be noted that in some embodiments, icons and displayed items shown on the UIs of FIGS. 1A-1D may be displayed simultaneously on a singly UI, and are separated only for clarity purposes.

Figure 1A:
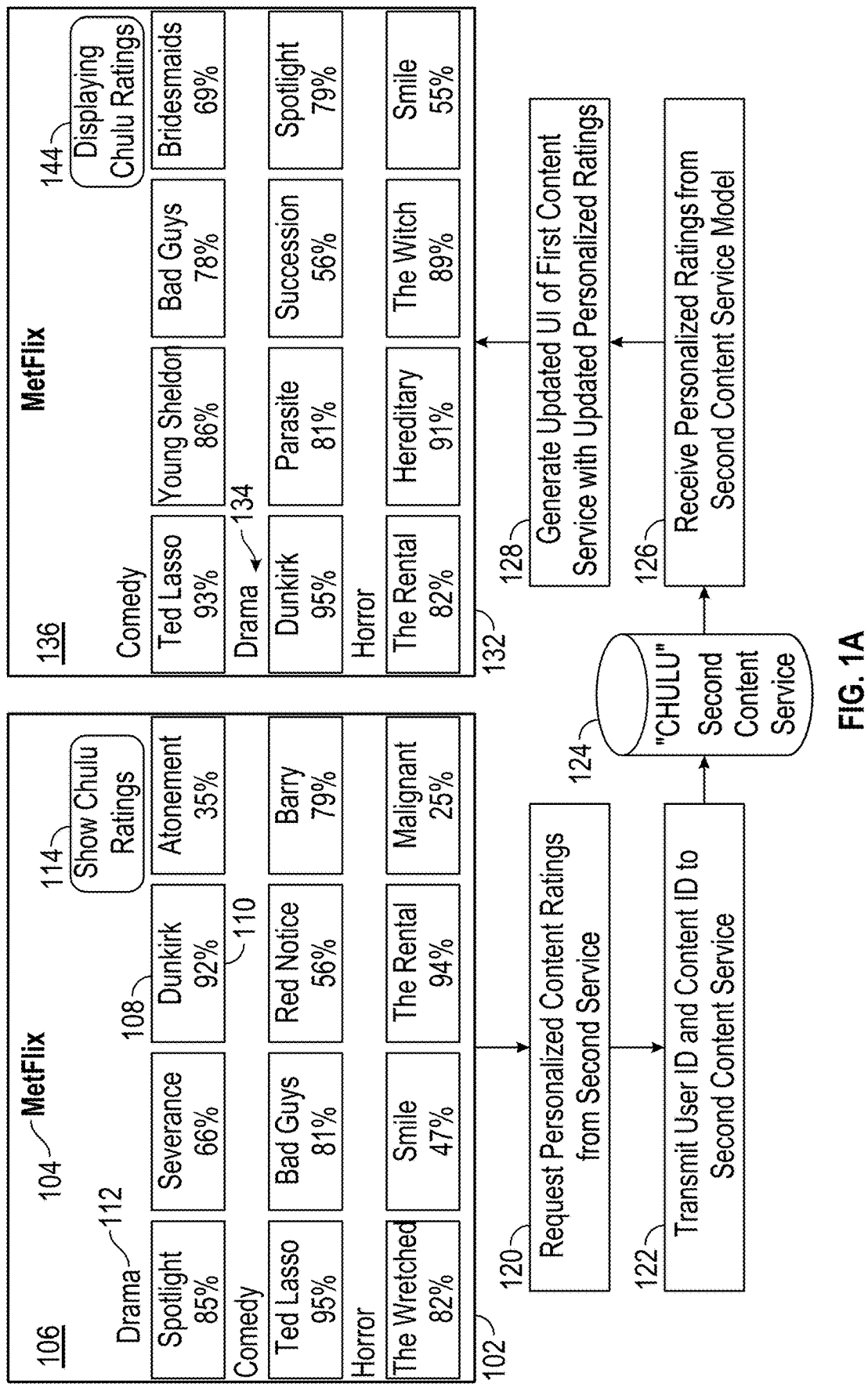
FIGS. 1A-1D show an illustrative diagrams of displaying personalized content ratings on a user interface (UI) of a content service, in accordance with some embodiments of this disclosure.

In FIG. 1A, an initial version of a UI 102 of a first content service 104, or first service, displayed on a user device is shown. In an embodiment, the UI is generated by a server of the first service and transmitted to the user device for display. The initial version of the UI 102 includes a home screen 106, or a landing page, of the first service with a grid of icons 108, each icon representing a unique content item. The user device includes an input/output interface, e.g., I/O interface 810 of user device 800 of FIG. 8 discussed below, configured to interact with the UI 102, e.g., via a remote control or voice commands, to select a content item, which then can be displayed for playback on a user device.

In an embodiment, each icon 108 within the grid of icons contains a graphical representation of a content item as well as a content rating 110 for that content item. The rating 110 may be a personalized rating generated for a logged in user, or an activated profile, that is generated using a recommendation model of the first service 104. The ratings 110 can be displayed as a percentage, as a "star" ranking (e.g., 3.5/5 stars), as an indicator displaying a likelihood that a user will enjoy the content, and the like. In some embodiments, the grid of icons is subdivided into categories 112, such as content genre category. As an example, each genre is displayed as a horizontal line containing multiple icons, where each horizontal line may contain additional content icons not shown that can be displayed by scrolling through the category. In some embodiments, content recommendations and ratings are generated using systems and methods described in the U.S. patent application Ser. No. 16/357,246, "Systems And Methods For Modifying Content Recommendations Based On Content Availability On Other Platforms," and U.S. patent application Ser. No. 15/056,578, "Methods And Systems Of Recommending Media Assets To Users Based On Content Of Other Media Assets," which are incorporated herein in their entirety.

The first service 104 may access a user profile, e.g., stored on a content service server (not shown) accessible over a network connection. The user profile is tied to a user ID, and may include user data, e.g., demographic data, subscription status, content viewing history, content watching habits, lists of content a user has started to watch but failed to complete, and the like.

In an embodiment, the UI 102 of the first service 104 includes an option 114 to display ratings from a second content service. For example, a second service may have a more accurate recommendation model, or may have access to a higher quality or quantity of user data. When the option 114 is selected, a request 120 for personalized content ratings is transmitted 122, e.g., from the server of the first service to a server of the second service over a network connection.

The request may include a user ID and one or more content IDs.

In an embodiment, the same user ID is associated with a profile of the user in both the first service and the second service, for example a user email address. In a further embodiment, a user ID used by the first service is not the same as the user ID used by the second service, and a matching user ID of the second service is associated with the user ID of the first service. For example, the second service may be configured to grant access to the first service, e.g., via an application programming interface (API), of a user profile. In an embodiment, a setting within the UI of the second service is configured to grant access to the recommendation model of the second service to the first service after transmitting login information, e.g., a login ID and a password associated with a user profile, to the first service. The user profile of each content service includes user data associated with that particular content service. In an embodiment, the user profile of the second service is accessed by the first service via an API.

The content ID can be used to identify the same content on multiple content services. In an embodiment, different content services assign different content ID to the same content. In such a case, the content ID of the content displayed by the first service is matched, e.g., using content title information stored in metadata associated with the content item, with the content ID of the content item on the second service. In a further embodiment, a list containing multiple content IDs is transmitted to the second service. For example, the content IDs of the top 10 content items of each content category 112 shown on the home screen 106 of the first service are transmitted to the second service 124.

The second service 124 includes a recommendation model for generating personalized content ratings for each user profile. When the user ID and content IDs are received by the second service 124, personalized content ratings for each of the associated content items are generated using the recommendation model of the second service 124.

The generated personalized content ratings are received by the first service 126, and an updated version of the UI 132 of the first service 104 is generated 128, e.g., either by the server of the first service or by the processing circuitry of the user device, and displayed. The updated UI 132 displays an updated home screen 136 including the personalized content ratings generated by the recommendation model of the second service 124. In an embodiment, the updated home screen 136 further displays an updated list or order of content items within a category 134, and/or and updated order of the displayed categories shown on the updated home screen 136.

In an embodiment, the first service 104 includes content recording capabilities, e.g., recording of a broadcast television signal, a cable network provider, an IPTV provider, an OTT live video TV provider, and the like. As an example, the first service 104 includes recording options such as via a digital video recorder (DVR) where content is saved, e.g., to a cloud storage, to a network DVR, to a local storage device, and the like. In an embodiment, the first service 104 is configured to suggest content items for viewing based on received personalized ratings, for example ratings received from the second service 124 or based on a recommendation model of the second service. In a further embodiment, the first service 104 is configured to automatically record content, e.g., from a broadcast television signal, a cable network provider, an IPTV provider, an OTT live video TV provider, and the like, based on the received personalized rating scores and via a recording device, such as a DVR.

In an embodiment, the updated home screen 106 includes an indicator 144 that the personalized ratings shown on the updated home screen 136 are generated by the second service rather than by the first service. In further embodiments discussed below, the updated personalized ratings shown include ratings that are generated using recommendation models of both the first and the second service.

The disclosed embodiments allow the first service to access a microservice of a second service, such as a recommendation engine, in order to generated or retrieve up-to-date personalized content ratings or scores, i.e., personalized content rating for the content item for a user profile as if the content was displayed on a UI of the second content service.

It should be noted that there are incentives for all various content services to share recommendation models and data. Playback events, such as pause/resume/ad skip, not completing watching content, and the like, for a particular content item can be shared back to the second provider, which allows the second provider to update their recommendation model with additional data points for the user. This could further allow pausing the playing of a content item on one service and resuming the playback on another, or keeping track of watched episodes or seasons of a television show across various platforms. For example, a UI of a service can be modified by displaying an updated list of seasons or episodes of a television show even if the previous episode has been watched using a separate content service. In an embodiment, if one episode of a television show has been watched on the second service, the first service can retrieve the user data and display an icon for the subsequent episode on the UI 102 of the first service, e.g., via a selectable button showing a "Play Next Episode" option.

Thus, the exchange of ratings results between services, using recommendation models of one or many services, allows for a 'Recommendation-as-a-Service' (RaaS) model, where the recommendation models of a service can be provided as a product accessible to other services. In an embodiment, a first service is configured to allow a choice of a preferred provider from multiple recommendation model providers, and query personalized ratings from that provider.

Figure 1B:
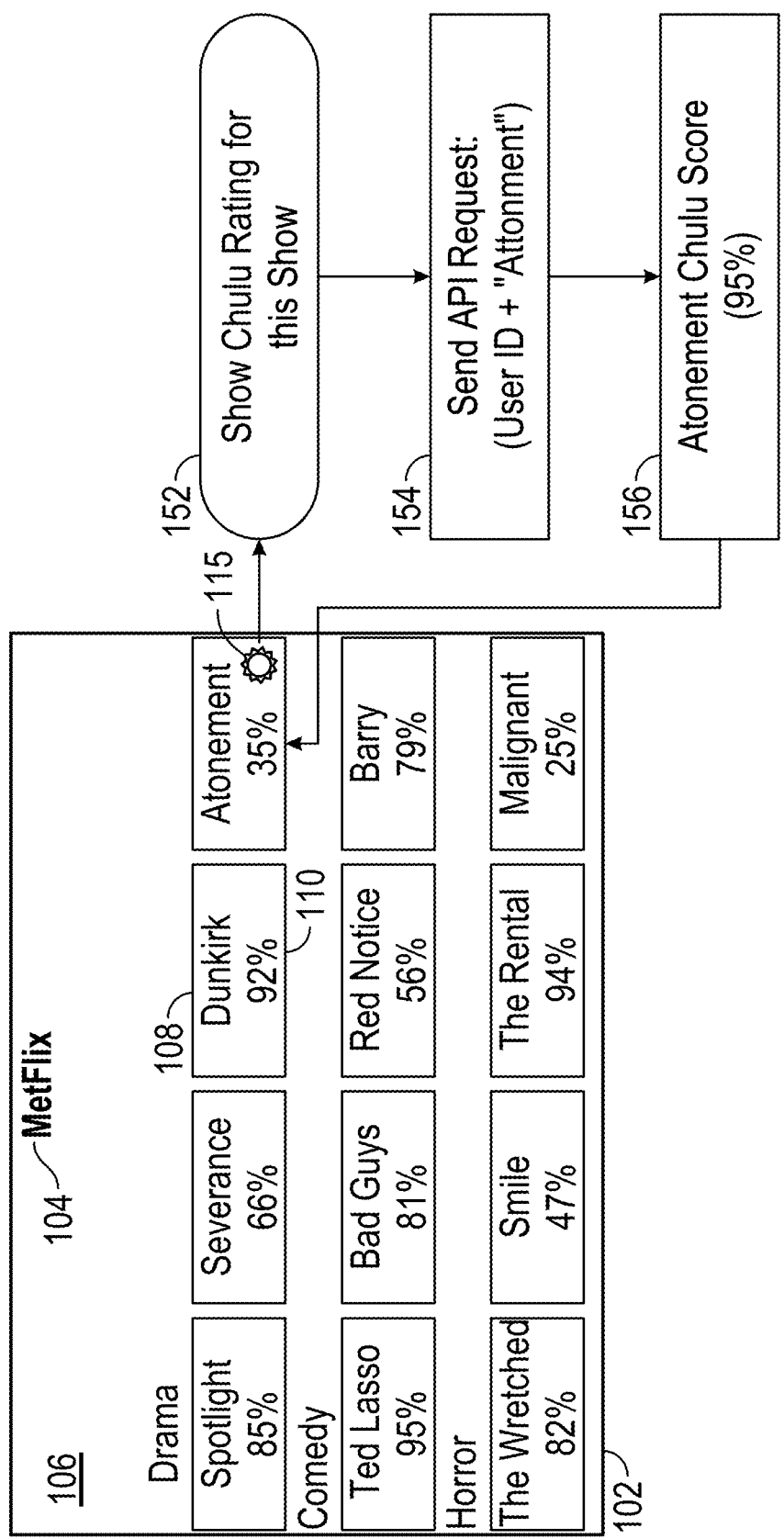

Turning now to FIG. 1B, an example of an initial version of the UI 102 of the first service 104 is shown with a home screen 106 showing a grid of icons 108 and personalized content ratings 110. In this embodiment, a setting to display a personalized content rating for a particular item is available, e.g., by selecting a setting icon 115 displayed on the content item, by entering a submenu via an input device, and the like. The setting allows for a request 152 to retrieve a personalized content rating from a second content service for the content item to be initiated. In an embodiment, an API request 154 is transmitted from the first service to the second service to retrieve the personalized content rating based on the recommendation model of the second service. The request may include the user ID associated with a user profile, and the content ID for that particular content item. An updated personalized content rating from the second service is received, and the icon representing the content item displayed on the home screen 106 of the first service is modified to show the personalized content rating 156.

Figure 1C:
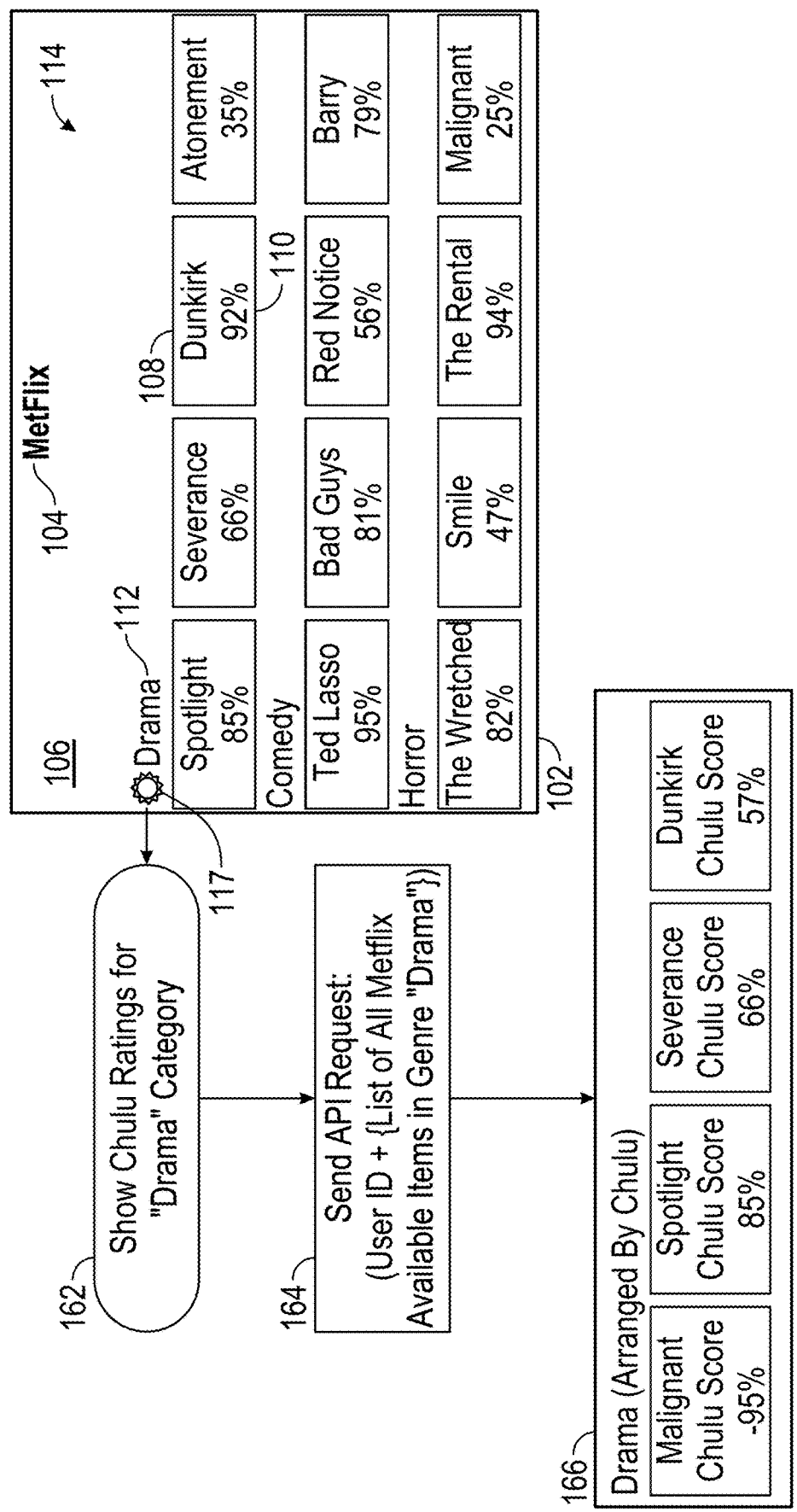

FIG. 1C is an example of a diagram showing steps for updating the content ratings of an entire category of content items displayed on the home screen 106 of the first service 104. In an embodiment, a setting for displaying a personalized content rating for an entire content category 112 is available, e.g., by selecting a setting icon 117 displayed adjacent to the content category, by entering a submenu via an input device, and the like. The setting allows for a request 162 to retrieve personalized content ratings for all items within a content category to be initiated. In an embodiment, an API request 164 is transmitted from the first service to the second service to retrieve the personalized content ratings based on the recommendation model of the second service. The request may include the user ID associated with a user profile, and content IDs for all items within the content category. Updated personalized content ratings from the second service are received, and the icons representing content items within the category displayed on the home screen 106 of the first service are modified to show the updated personalized content ratings 166. In some embodiments, which content items are displayed within the category are updated based on the received personalized content ratings from the second service. For example, the personalized content ratings of several content items previously shown within the category may fall below a threshold, and other content items having a higher personalized content rating, previously not shown, are now displayed within the category on the home screen 106 of the first service.

Figure 1D:
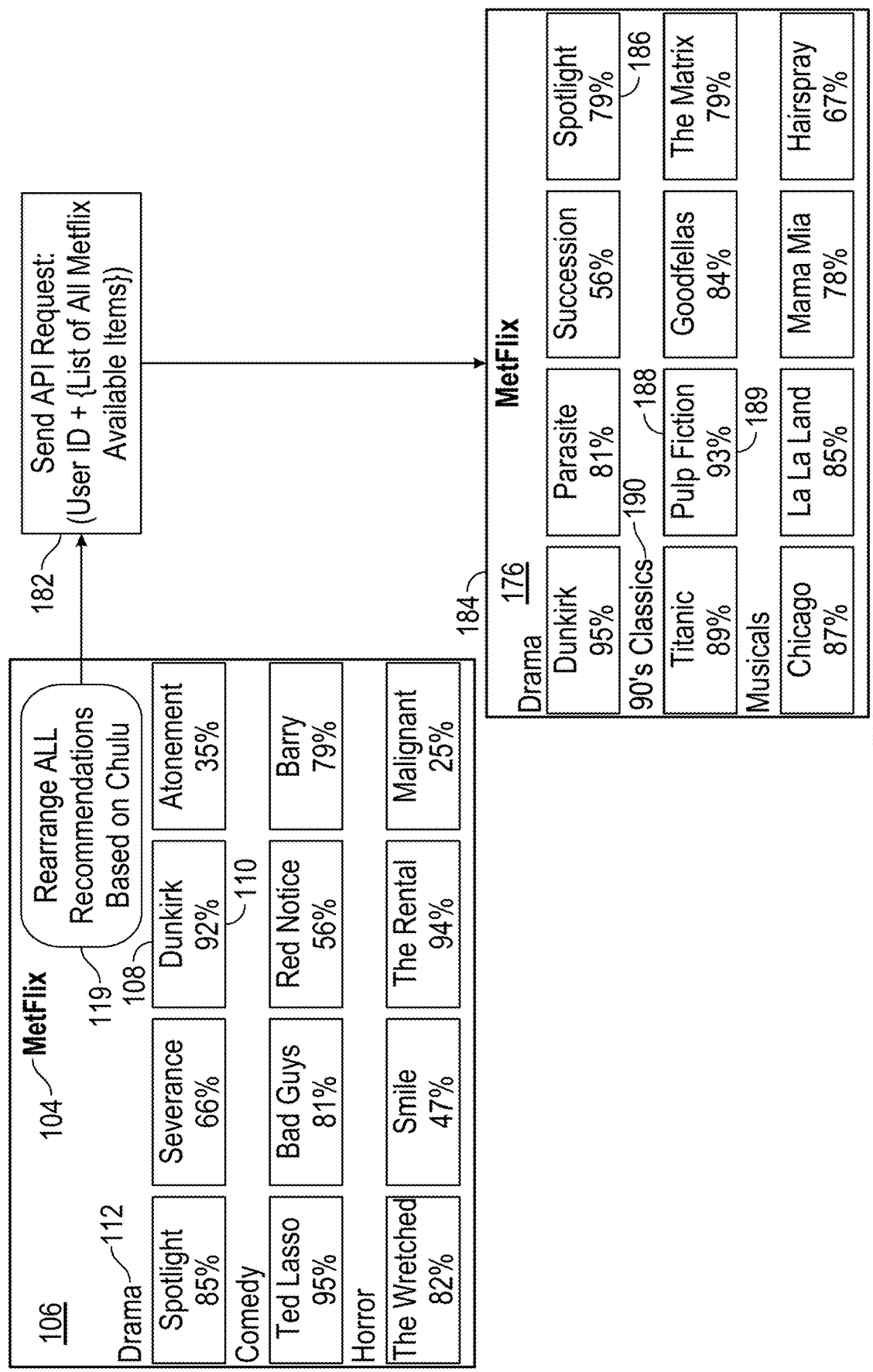

FIG. 1D is an example of a diagram showing steps for generating an entirely updated home screen 176 of the UI of the first service. In an embodiment, a setting to retrieve and display personalized content ratings for the entire home screen 176 based on a recommendation model of a second service is available on the initial home screen 106, e.g., via a setting icon 119. In a further embodiment, the setting includes a request to update the personalized content ratings of all items available on the first service based on the recommendation model of the second service, not just content items or categories displayed on the initial home screen 106. This may result in an updated home screen 176 that includes items, as well as categories, not previously shown in the initial home screen 106 of the first service 104.

The setting allows for a request 182 to retrieve personalized content ratings for all content items that are available on the first service 104. In an embodiment, an API request 182 is transmitted from the first service to the second service to retrieve personalized content ratings of all available content items based on the recommendation model of the second service. The request may include the user ID associated with a user profile, and content IDs for all content items available on the first service. Updated personalized content ratings for all available content items on the first service are retrieved from the second service, and the icons representing the content items are modified to show the personalized content rating 186 from the second service. In some embodiments, which content items are displayed within a category, as well as which categories are displayed on the home screen 176, are updated based on the received personalized content ratings from the second service. For example, a category 190 not previously shown on the initial home screen 106 is displayed on the updated home screen 176, along with newly displayed content items 188 and their associated personalized content rating 189.

Figure 2:
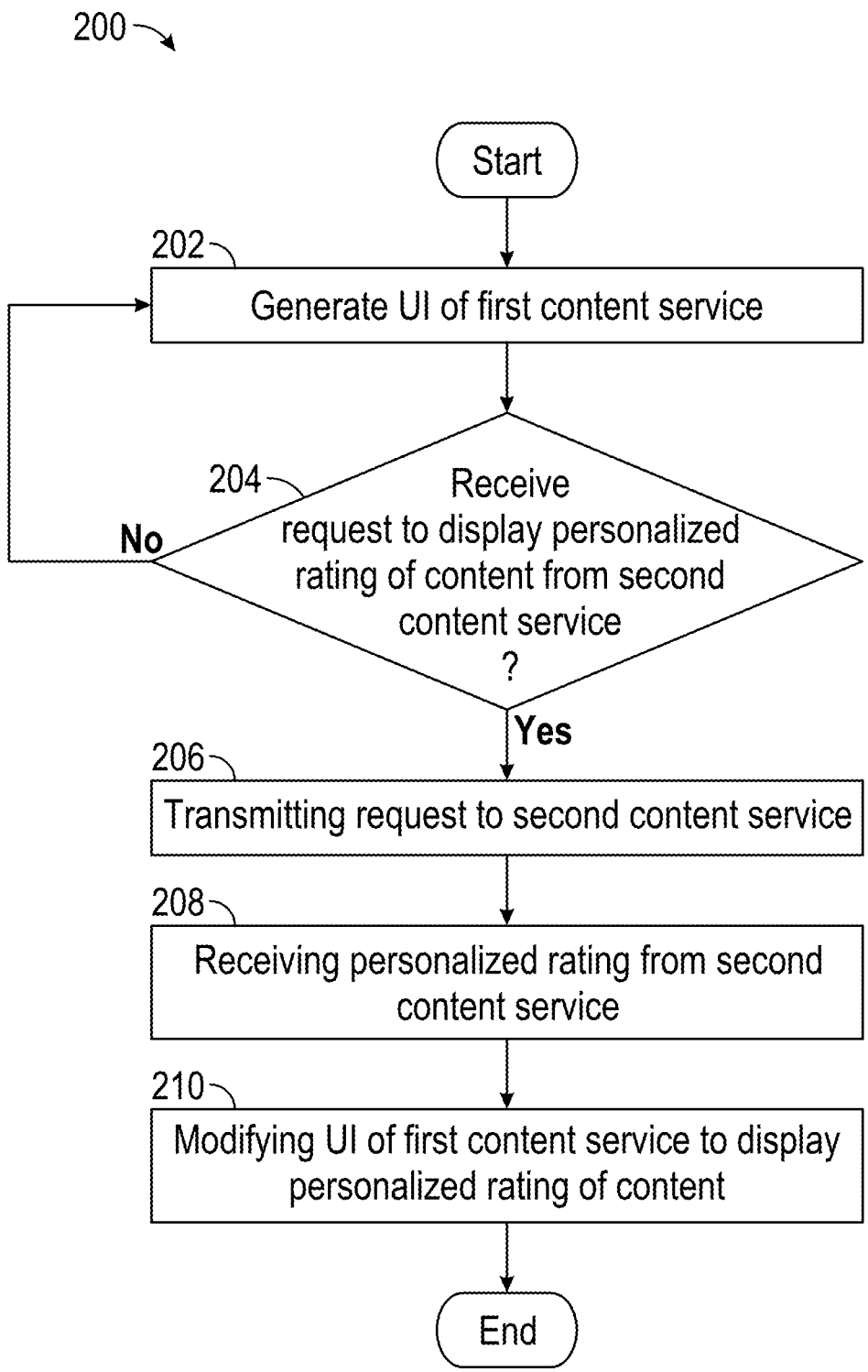
FIG. 2 is a flowchart of a method for modifying a UI of a content service, in accordance with some embodiments of this disclosure.

FIG. 2 is a flowchart 200 of a method for modifying a UI of a content service, in accordance with some embodiments of this disclosure. In some embodiments, the steps of the method are performed by a single device. In other embodiments, different steps may be performed by different devices, e.g., some steps are performed by a user device, some steps are performed by a first content service server, and some steps are performed by a second content service server.

At step 202, a user interface (UI) of a first content service, or first service, is generated, e.g., by a control circuitry of the user device 800 or of the rating service 822 of FIG. 8, for display on a user device, for example user device 800 discussed below in FIG. 8. In an embodiment, the UI includes a home screen displaying a grid of icons representing various content items, such as movies, television shows, and the like, such as the home screen 106 of the first content service 104 shown in FIG. 1 above. The UI further includes a rating for each of the various content items. In an embodiment, the ratings are personalized ratings generated by a recommendation model of the first service based on a user profile. The user profile is tied to a user ID, and may include user data, e.g., demographic data, subscription status, content viewing history, content watching habits, lists of content a user has started to watch but failed to complete, and the like.

Figure 8:
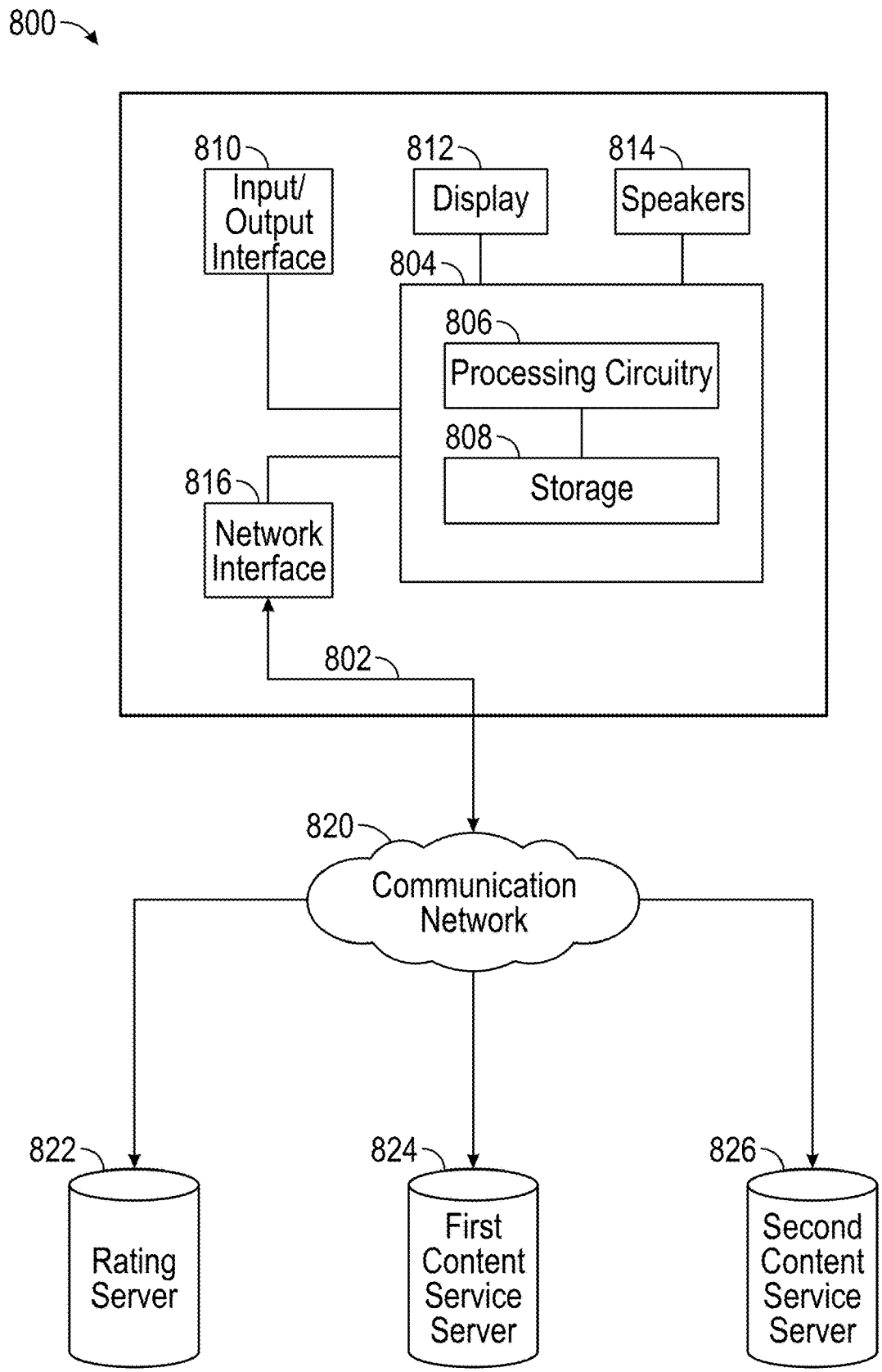
FIG. 8 is an illustrative, generalized embodiment of a system for generating personalized content ratings, in accordance with some embodiments of this disclosure

At step 204, it is determined, e.g., by a control circuitry of the user device 800 or of the rating service 822 of FIG. 8, if a request to display an updated personalized rating for one or more content items is received, such as via a selection input on the UI. If no request is received, the method returns to step 202, otherwise, if such a request is determined to have been received, the method continues with step 206.

Figure 3:
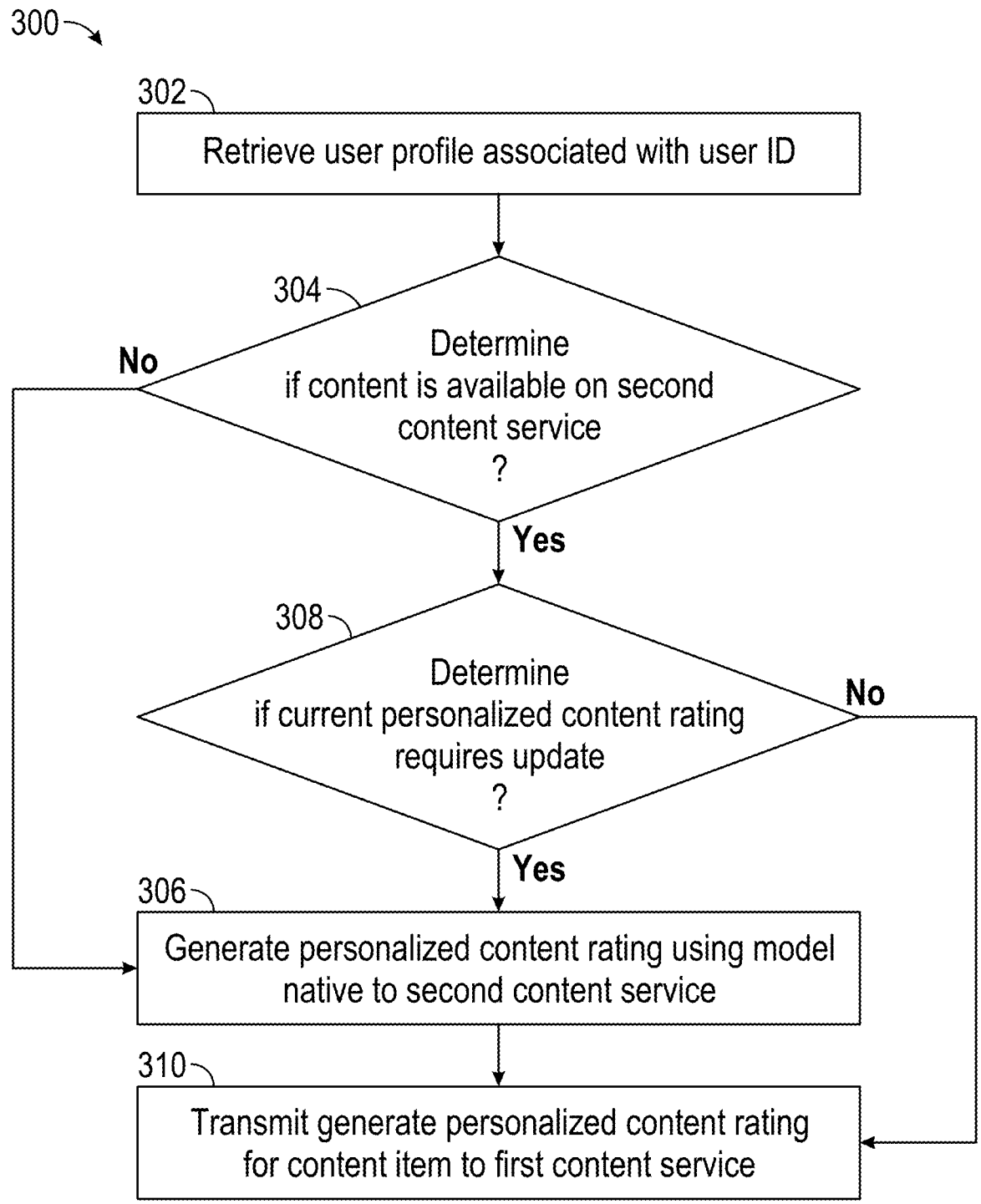
FIG. 3 is a flowchart of a method for transmitting personalized content ratings, in accordance with some embodiments of this disclosure.

At step 206, the request is transmitted to the second service where personalized content ratings are retrieved or generated, e.g., by a second content service server, as discussed further in FIG. 3. The received personalized content ratings are generated using a recommendation model associated with the second service. In an embodiment, the request includes a user ID associated with a user profile and at least one content ID identifying a content item. The request may include a plurality of content IDs for multiple content items.

At step 208, the personalized content ratings are received, e.g., by a user device or by a first content service server, from the second service and at step 210 the UI of the first service is modified to display the personalized content ratings alongside content item icons on a user device. In an embodiment, the modified UI is generated by the control circuitry of the user device 800. In a further embodiment, the modified UI is generated by control circuitry of a remote rating service 822, and displayed on a display of the user device 800.

FIG. 3 is a flowchart 300 of a method for transmitting personalized content ratings, in accordance with some embodiments of this disclosure. In an embodiment, the method is performed by control circuitry of a remote rating service 822. In a further embodiment, different steps may be performed by different devices, e.g., some steps are performed by a user device, some steps are performed by a first content service server, and some steps are performed by a second content service server.

At step 302, a user profile associated with a received user ID is retrieved. The user profile is tied to a user ID, and may include user data, e.g., demographic data, subscription status, content viewing history, content watching habits, lists of content a user has started to watch but failed to complete, and the like. In an embodiment, a user ID received from a first service is the same user ID associated with the user on the second service, e.g., an email address. In a further embodiment, a user ID used by the first service is not the same as the user ID used by the second service, and a matching user ID of the second service is associated with the user ID of the first service. For example, the second service may be configured to grant access to the first service, e.g., via an application programming interface (API), of a user profile. In a further embodiment, a user must log into the second service and grant permission to the first service for accessing a user profile associated with the user on the second service. The user profile of the second service may be accessed by the first service via an application programming interface (API).

At step 304, it is determined if content associated with content ID, e.g., the content ID transmitted in step 206 of FIG. 2, is available on the second service. If the content is not available on the second service, the method continues at step 306, where a recommendation model native to the second service is used to generate a personalized content rating for the content. The generated personalized content rating is transmitted back to the first service at step 310 and the method ends.

If the content is available on the second service, the method continues at step 308, where a current personalized content rating for the content is retrieved, e.g., from a ratings database of the second service, and it is determined if the current personalized content rating requires and update. For example, if the personalized content rating had been generated within a predetermined period of time, e.g., within the last week, then the personalized content rating is determined to not require an update, and the generated personalized content rating is transmitted back to the first service at step 310 where the method ends.

If the generated personalized content rating is determined to require an update, such as if personalized content rating had been generated more than a predetermined period of time, e.g., more than a week ago, the method continues at step 306, where a recommendation model native to the second service is used to generate an updated personalized content rating for the content. The generated personalized content rating is transmitted back to the first service at step 310 and the method ends.

Figure 4A:
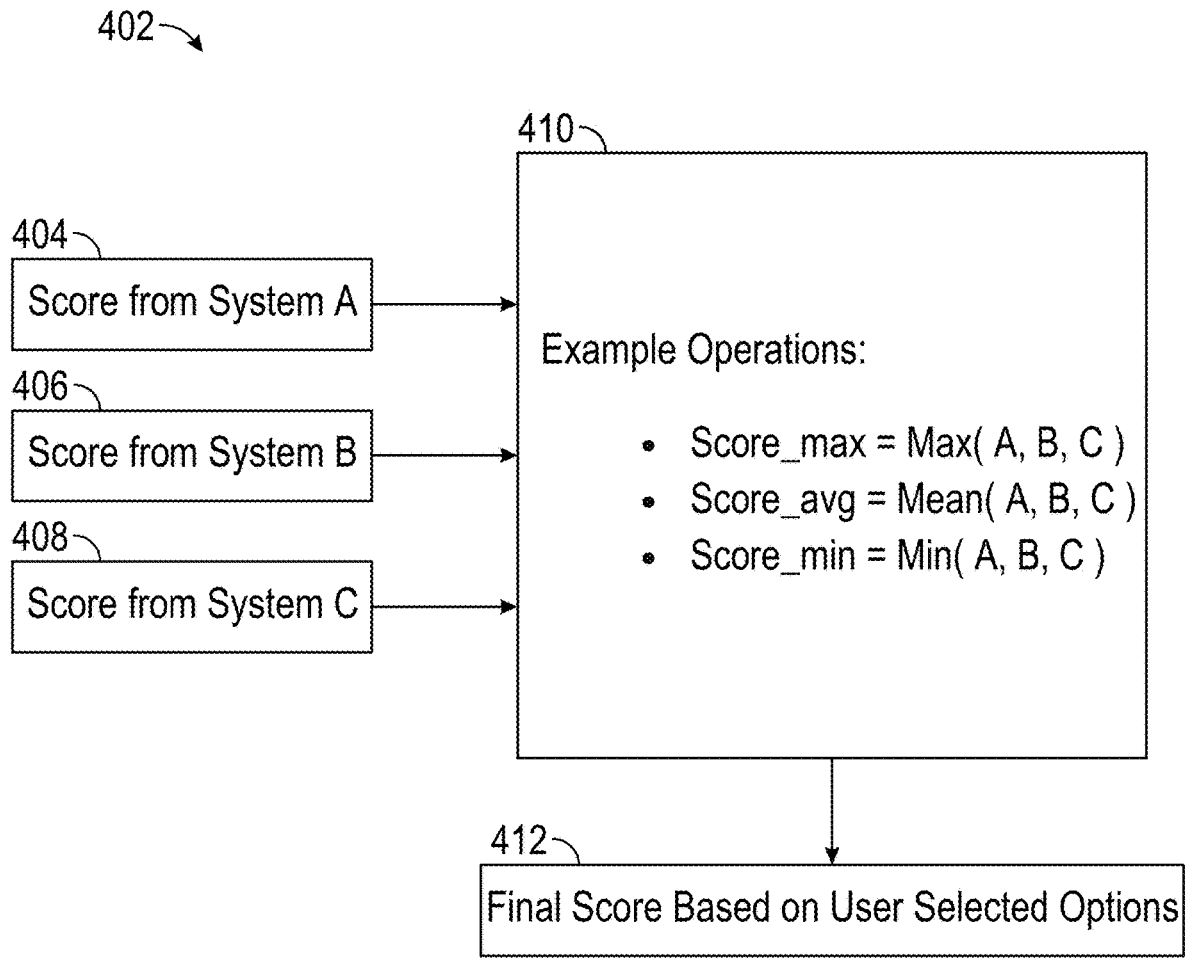

FIGS. 4A and 4B are flowcharts of a method for generating an aggregated personalized content rating, in accordance with some embodiments of this disclosure. Beginning with FIG. 4A, a flowchart 402 is shown for generating a personalized content rating from multiple sources. For example, a personalized content rating score from content service A 404 is retrieved, e.g., by the control circuitry of the user device 800; a personalized content rating score from content service B 406 is retrieved, and a personalized content rating score from content service C 408 is retrieved. At 410, a function is performed on the retrieved personalized content rating scores. For example, the maximum value, the minimum value, or the average value of the retrieved personalized content rating scores is determined. In an embodiment, the function used may be selected within a setting option the UI of the first service. At 412, a final personalized content rating score for a content is determined based on the selected function.

Turning to FIG. 4B, a flowchart 422 is shown for generating an updated UI of a first service based on personalized content rating from multiple sources. For example, personalized content rating scores of content item "Title 1" of category α is retrieved from content services A, B, and C; personalized content rating scores of content item "Title 5" of category β is retrieved from content services A, B, and C; and personalized content rating scores of content item "Title 8" of category δ is retrieved from content services A, B, and C. At 420, a function is performed on the retrieved personalized content rating scores to determine updated personalized content rating scores. For example, the maximum value, the minimum value, or the average value of the retrieved personalized content rating scores of each of Titles 1, 5, and 8 are determined. In an embodiment, the function used may be selected within a setting option the UI of the first service. At 432, an updated order or display of the content items with the updated personalized content rating scores is determined based on the selected function and displayed on the UI of the first service.

Figure 5:
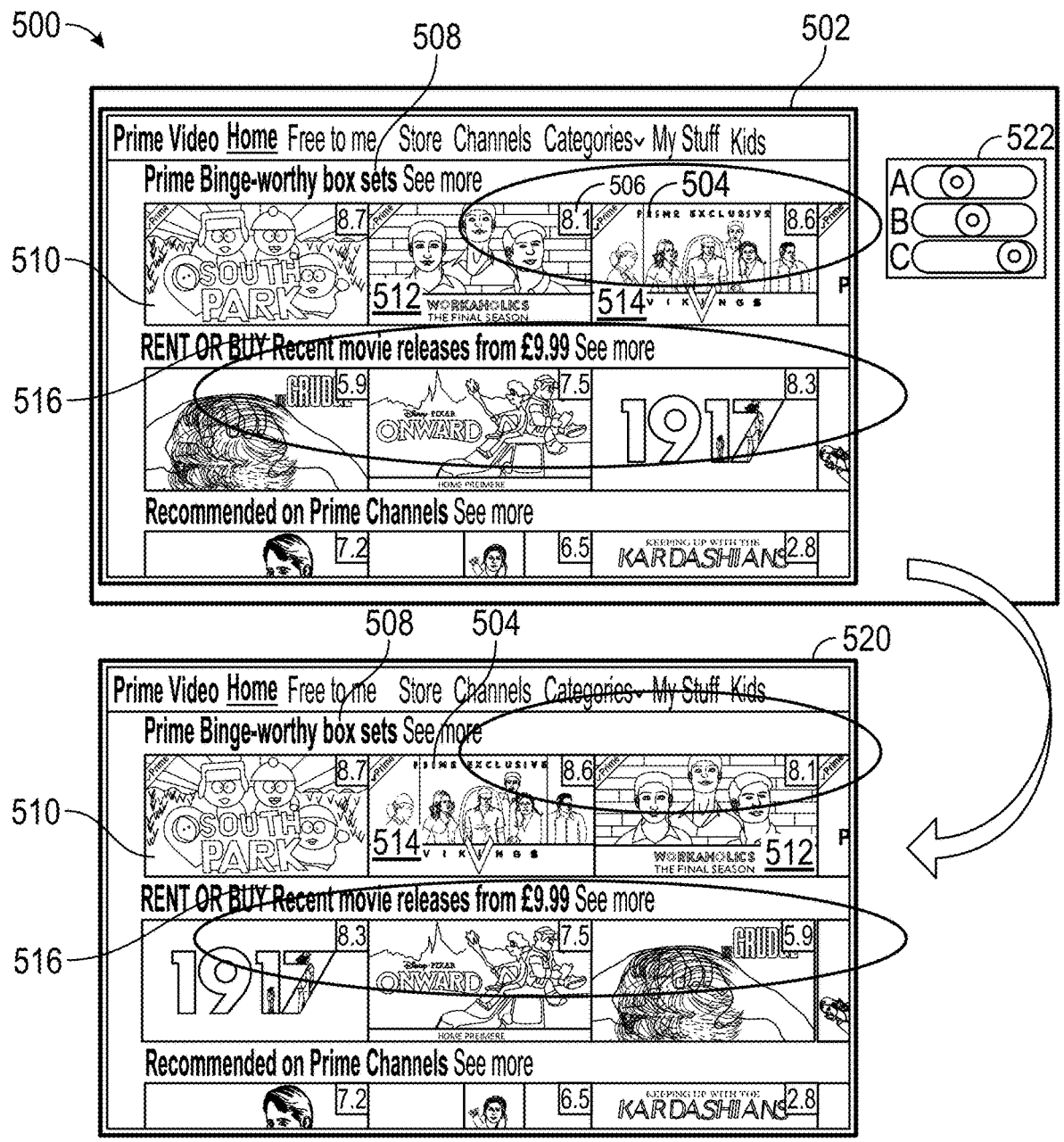
FIG. 5 shows an updated UI with personalized content ratings, in accordance with some embodiments of this disclosure.

FIG. 5 shows an updated UI 500 with personalized content ratings, in accordance with some embodiments of this disclosure. An initial UI 502 of a first service is shown, where the UI includes a home screen with a grid of graphical icons representing content items. The icons are arranged by categories, with each category displayed on a horizontal line. For example, a first category 508 of "Binge-worthy box sets" is displayed with content items 510, 512, and 514. A personalized content rating 506 for each of the content items within the first category 508 is overlayed on the relevant content item icon. For example, the personalized content rating may be retrieved from a second service as described herein.

In an embodiment, the personalized content rating is a rating score calculated from recommendation models of multiple content services, e.g., as discussed above regarding FIGS. 4A and 4B. In a further embodiment, the UI includes an adjustable setting 522 allowing for modification of a weight associated with each of the multiple content services. For example, personalized content ratings generated by service C may be preferable, but recommendations offered by services A and B may still be considered to a lesser degree. The adjustable setting 522 can be modified to assign more weight to service C than to services A and B, and a relevant personalized content rating 506 is generated and displayed over a content item icon 504.

As shown in 520, and updated UI is displayed, where content items 510, 512, and 514 within the first category 508 are rearranged to display higher rated content items first. Similarly, content items within a second category 516 are rearranged to display higher rated content items first.

Figure 6:
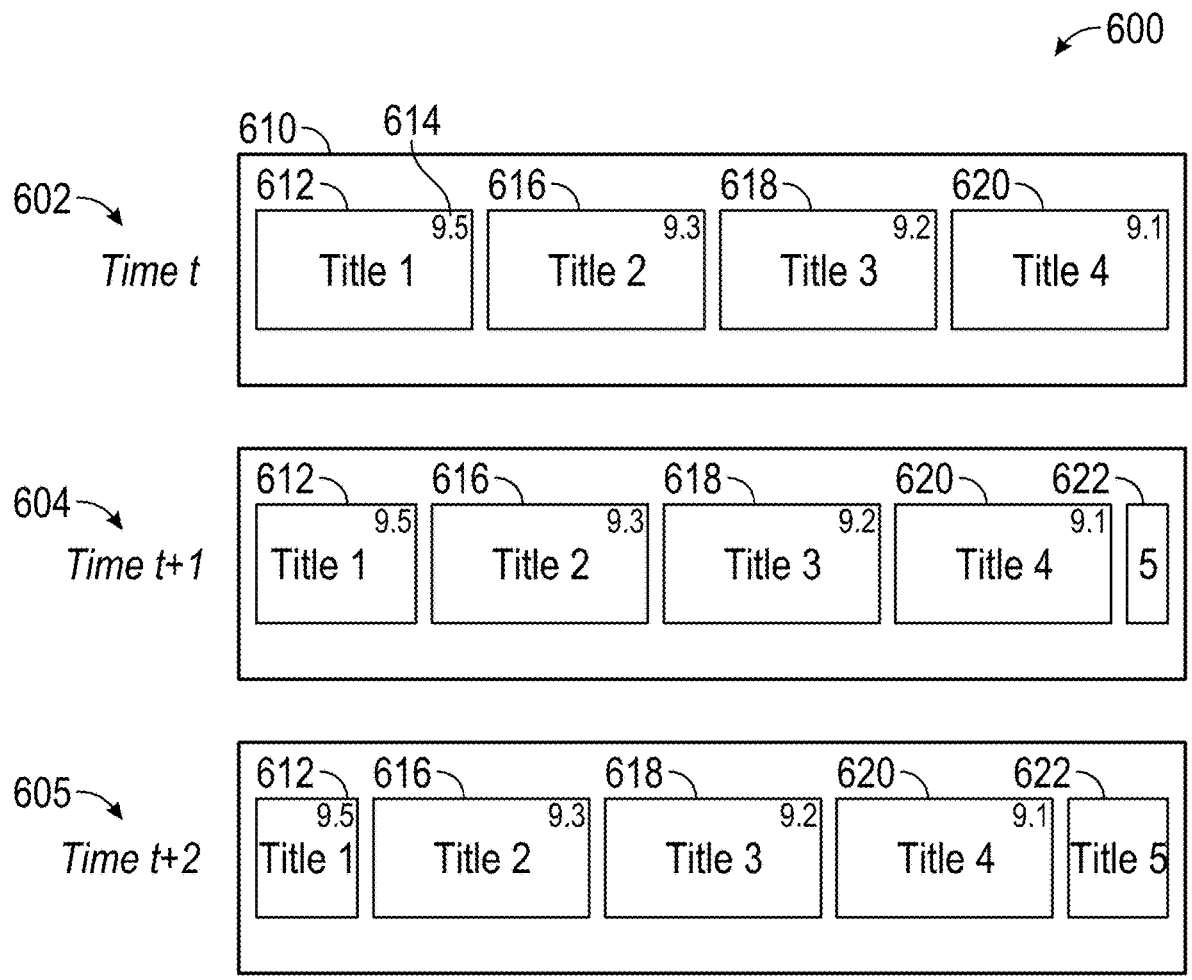
FIG. 6 shows a section of a content service UI over a period of time, in accordance with some embodiments of this disclosure.

FIG. 6 shows a section 600 of a content service UI over a period of time, in accordance with some embodiments of this disclosure. At Time t 602, a section 610 of content items, including icons representing Title 1 612, Title 2 616, Title 3 618, and Title 4 620, is displayed on an UI of a first service. The section 610 may include content items within a specific category, e.g., a content genre. Personalized content ratings 614 are overlayed on each of the icons. In an embodiment, the display is configured to automatically scroll over time. At Time t+1 604, each of the icons 612, 616, 618, and 620 are shifted over toward a left side of the display, and a small portion of Title 5 622 is shown on the right side of the display. At Time t+2, the icons continue to shift leftward, with a smaller portion of the icon for Title 1 612 being shown, and a larger portion of the icon for Title 5 622 being shown.

Figure 7:
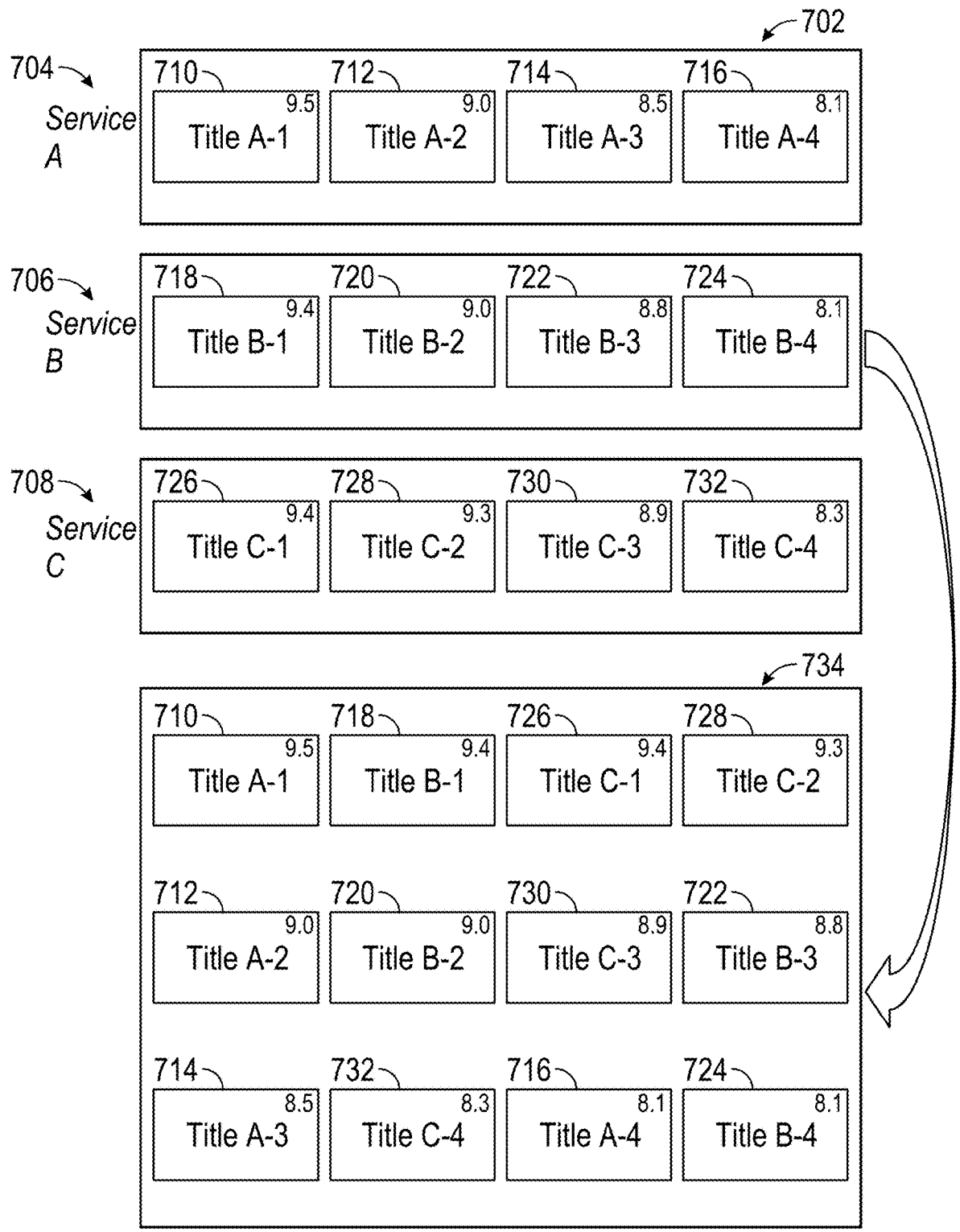
FIG. 7 shows an updated and reorganized UI, in accordance with some embodiments of this disclosure.

FIG. 7 shows an updated and reorganized UI, in accordance with some embodiments of this disclosure. Organization of content items according to personalized content ratings of three separate services is shown 702. A first content service, Service A 704, contains content items 710, 712, 714, and 716 arranged in order of personalized content ratings. Similarly, a second content service, Service B 706, contains content items 718, 720, 722, and 724 arranged in order of personalized content ratings, and a third content service, Service C 708, contains content items 726, 728, 730, and 732 arranged in order of personalized content ratings. In an embodiment, the personalized content ratings are generated using a recommendation model of each of the respective content services 704, 706, and 708.

An updated UI 734 is generated based on the content items displayed in all three services. For example, a grid of icons is generated from all available services in descending order of personalized content ratings. Thus, items 710, 718, 726, and 728 are arranged in the top row, followed by items 712, 720, 730, and 722, and finally items 714, 732, 716, and 724, all arranged in descending order according to the personalized content ratings generated by each respective content service recommendation model. In a further embodiment, each personalized content rating is generated according to a generated aggregating score, as discussed above, e.g., regarding FIGS. 4A and 4B.

FIG. 8 is an illustrative, generalized embodiment of a system for generating personalized content ratings, in accordance with some embodiments of this disclosure. User device 800 is depicted having components that are internal and external to user device 800, for example, processing circuitry 806, storage 808, and network interface 816, such as Wi-Fi radio or UWB radio, which may each include one or more wireless antennas, input/output ("I/O") interface 810, display 812, speakers 814 and communications path 802. In some embodiments, each of the devices described herein (e.g., user device 800, rating server 822, first content service server 824, second content service server 826) may comprise some or all of the components of user device 800.

I/O interface 810 may provide content and data to control circuitry 804 and control circuitry 804 may be used to send and receive commands, requests, and other suitable data using I/O interface 810. I/O interface 810 may connect control circuitry 804 (and specifically processing circuitry 806) to one or more communications paths (e.g., via the network interface 816 and/or communication path 802). I/O functions may be provided by one or more of these communications paths, which may be shown as a single path in FIG. 8 to avoid overcomplicating the drawing.

Control circuitry 804 may be based on any suitable processing circuitry such as processing circuitry 806. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), GPUs, etc., and may include multiple parallel processing cores or redundant hardware. In some embodiments, processing circuitry 806 may be distributed across multiple separate processors or processing units, for example, multiple of the same type of processors or multiple different processors. In some embodiments, control circuitry 804 executes instructions stored in memory (i.e., storage 808) and/or other non-transitory computer readable medium. Specifically, control circuitry 804 may be instructed to perform the functions discussed above and below. For example, a device may execute or comprise the code required to execute instructions associated with at least a portion of a capable device and may provide instructions to control circuitry 804 to cause the generation of personalized content ratings and/or output an updated UI displaying updated personalized content ratings.

In some embodiments, control circuitry 804 may include communications circuitry (e.g., network interface 816) suitable for communicating with other networks (e.g., a LAN or a WAN), servers (e.g., a server accessed via the Internet), or devices, and/or the devices discussed with respect to FIGS. 1A-1D and 8. The instructions for carrying out the above-mentioned functionality may be stored on the storage 808 of the user device, or in a server connected to rating server 822, first content service server 824, or second content service server 826. The communications circuitry may include a modem, a fiber optic communications device, an Ethernet card, or a wireless communications device for communicating with other devices. Such communications may involve the Internet or any other suitable communications networks or paths. In addition, communications circuitry may include circuitry that enables peer-to-peer communication between devices.

Memory may be an electronic storage device provided as storage 808 that is part of control circuitry 804. As referred to herein, the phrase "electronic storage device" or "storage device" should be understood to mean any device for storing electronic data, computer software, or firmware, such as random-access memory, read-only memory, hard drives, optical drives, solid state devices, quantum storage devices, or any other suitable fixed or removable storage devices, and/or any combination of the same. Storage 808 may be used to store various types of data herein, such as instructions for performing the methods described herein, and any metadata about media and/or information about devices. Nonvolatile memory may also be used (e.g., to launch a boot-up routine and other instructions). Cloud-based storage (e.g., storage accessed via the Internet) may be used to supplement storage 808 or instead of storage 808.

A user may send instructions to control circuitry 804 using I/O interface 810 using an external device such as a remote control, mouse, keyboard, touch screen, etc. In some embodiments, control circuitry 804 correlates a user input with a location of a user interface element and performs an action based on the selected user interface element. Display 812 may be provided as a stand-alone device or integrated with other elements of device 800. For example, display 812 may be a touchscreen or touch-sensitive display and may be combined with I/O interface 810. Control circuitry 804 may provide output via I/O interface 810. In some embodiments, speakers 814 may be connected to an output device, such as a pair of headphones, a single speaker, a speaker array, etc., to output sound to a user.

The systems and methods described herein may be implemented using any suitable architecture. For example, the systems and methods described herein may be a stand-alone application wholly implemented on user device 800. In such an approach, instructions of the application are stored locally (e.g., in storage 808). In some embodiments, the systems and methods described herein may be a client-server-based application. Data for use by a thick or thin client implemented on device 800 is retrieved on demand by issuing requests to a server remote from the device 800. In some embodiments, the systems and methods provided herein are downloaded and interpreted or otherwise run by an interpreter or virtual machine (run by control circuitry 804). In some embodiments, some functions are executed and stored on one device and some are executed and stored on a second device.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
    generating for display a user interface (UI) of a first content service for a user logged into the first content service, wherein the UI comprises first content ratings as generated through the first content service;
    receiving a request, via the UI, that identifies a second content service, wherein the request is a request to modify the UI to display personalized second content ratings generated by the second content service, instead of the first content ratings, wherein:
        the second content ratings are generated separately from the first content ratings, and
        the second content ratings are generated by the second content service and are retrieved from the second content service in response to the request;
    in response to receiving the request to modify the UI to display personalized second content ratings generated by the second content service:
        transmitting the request to the second content service, wherein the request includes (a) a user ID of the user, and (b) a content ID of at least one content item that is available on the first content service to cause the second content service to:
            look up a profile of the user stored by the second content service based on the received user ID of the user; and
            generate the second content ratings based on the profile stored by the second content service for the at least one content item identified by the received content ID;
        receiving, from the second content service, at least one personalized content rating of the second content ratings that were generated by the second content service based on the profile and stored by the second content service for the at least one content item;
        ceasing display of the first content ratings on the UI; and
        replacing the first content ratings with the received at least one personalized content rating such that the UI of the first content service is caused to display the received at least one personalized content rating.

2. The method of claim 1, wherein transmitting the request to the second content service causes the second content service to:
    retrieve a user profile associated with the user ID on the second content service;
    generate the at least one personalized content rating using a rating model native to the second content service for the at least one content item based on the user profile; and
    transmit the generated at least one personalized content rating for the at least one content item to the first content service for display on the UI.

3. The method of claim 2, wherein generating the at least one personalized content rating using a model native to the second content service is based on a consumption history stored in the user profile.

4. The method of claim 2, wherein:
    the at least one content item is available on the second content service; and
    generating the at least one personalized content rating for the at least one content item comprises updating a previously generating personalized content rating for the at least one content item.

5. The method of claim 1, wherein the content ID is associated with a content item displayed on the UI of the first content service.

6. The method of claim 1, wherein the content ID is associated with a genre of content items displayed on the UI of the first content service.

7. The method of claim 1, wherein the content ID is associated with a landing page displaying a plurality of content items displayed on the UI of the first content service.

8. The method of claim 1, further comprising:
    sending the request to a plurality of second content services;
    receiving, from the plurality of second content services, a plurality of personalized content ratings for the at least one content item;
    generating an amalgamated personalized content rating for the at least one content item based on the received plurality of personalized content ratings; and
    modifying the UI of the first content service to display the amalgamated personalized content rating.

9. The method of claim 8, wherein the UI of the first content service comprises a customization option for adjusting a weight associated with at least two of the plurality of second content services, and wherein the amalgamated personalized content rating changes based on the adjusted weights.

10. A system comprising:
    a memory; and
    a control circuitry configured to:
        generate for display a user interface (UI) of a first content service for a user logged into the first content service, wherein the UI comprises first content ratings as generated through the first content service;
        receive a request, via the UI, that identifies a second content service, wherein the request is a request to modify the UI to display personalized second content ratings generated by the second content service, instead of the first content ratings, wherein:
            the second content ratings are generated separately from the first content ratings, and
            the second content ratings are generated by the second content service and are retrieved from the second content service in response to the request;
        in response to receiving the request to modify the UI to display personalized second content ratings generated by the second content service:
            transmit the request to the second content service, wherein the request includes (a) a user ID of the user, and (b) a content ID of at least one content item that is available on the first content service to cause the second content service to:
  look up a profile of the user stored by the second content service based on the received user ID of the user; and
  generate the second content ratings based on the profile stored by the second content service for the at least one content item identified by the received content ID;
receive, from the second content service, at least one personalized content rating of the second content ratings that were generated by the second content service based on the profile and stored by the second content service for the at least one content item;
cease display of the first content ratings on the UI; and
replace the first content ratings with the received at least one personalized content rating such that the UI of the first content service is caused to display the received at least one personalized content rating.

11. The system of claim 10, wherein transmitting the request to the second content service causes the second content service to:
  retrieve a user profile associated with the user ID on the second content service;
  generate the at least one personalized content rating using a rating model native to the second content service for the at least one content item based on the user profile; and
  transmit the generated at least one personalized content rating for the at least one content item to the first content service for display on the UI.

12. The system of claim 11, wherein generating the at least one personalized content rating using a model native to the second content service is based on a consumption history stored in the user profile.

13. The system of claim 11, wherein:
  the at least one content item is available on the second content service; and
  generating the at least one personalized content rating for the at least one content item comprises updating a previously generating personalized content rating for the at least one content item.

14. The system of claim 10, wherein the content ID is associated with a content item displayed on the UI of the first content service.

15. The system of claim 10, wherein the content ID is associated with a genre of content items displayed on the UI of the first content service.

16. The system of claim 10, wherein the content ID is associated with a landing page displaying a plurality of content items displayed on the UI of the first content service.

17. The system of claim 10, wherein the control circuitry is further configured to:
  send the request to a plurality of second content services;
  receive, from the plurality of second content services, a plurality of personalized content ratings for the at least one content item;
  generate an amalgamated personalized content rating for the at least one content item based on the received plurality of personalized content ratings; and
  modify the UI of the first content service to display the amalgamated personalized content rating.

18. The system of claim 17, wherein the UI of the first content service comprises a customization option for adjusting a weight associated with at least two of the plurality of second content services, and wherein the amalgamated personalized content rating changes based on the adjusted weights.

19. The method of claim 1, wherein the request received via the UI is based on an interaction with a UI element comprising a selectable option to change the UI to display the second content ratings retrieved from the second content service instead of the first content ratings generated through the first content service.

20. The system of claim 10, wherein the request received via the UI is based on an interaction with a UI element comprising a selectable option to change the UI to display the second content ratings retrieved from the second content service instead of the first content ratings generated through the first content service.

* * * * *